United States Patent [19]

Momose

[11] Patent Number: 4,574,323
[45] Date of Patent: Mar. 4, 1986

[54] FLEXIBLE MAGNETIC DISK DRIVE

[75] Inventor: Masao Momose, Suwa, Japan

[73] Assignee: Kabushiki Kaisha Suwa Seikosha, Tokyo, Japan

[21] Appl. No.: 435,201

[22] Filed: Oct. 19, 1982

[30] Foreign Application Priority Data

Oct. 20, 1981 [JP] Japan .............................. 56-167482

[51] Int. Cl.[4] .......................... G11B 17/04; G11B 5/82
[52] U.S. Cl. ...................................................... 360/99
[58] Field of Search ................................... 360/97-99; 310/14, 23, 30

[56] References Cited

U.S. PATENT DOCUMENTS

| 3,398,302 | 8/1968 | Harnau | 310/14 |
| 3,434,026 | 3/1969 | Doyle | 310/30 X |
| 3,890,643 | 6/1975 | Dalziel | 360/99 |
| 4,413,294 | 11/1983 | Beijer | 360/97 X |

Primary Examiner—A. J. Heinz
Attorney, Agent, or Firm—Blum Kaplan Friedman Silberman & Beran

[57] ABSTRACT

A flexible magnetic disk drive includes interengaging members which necessitate a sequence of operations in use which assure proper disk positioning and avoid damage to the disk and magnetic head. The disk is clamped for rotation between a center pulley and a clutch plate which is compressed by a plate spring. A disk ejection mechanism is provided.

17 Claims, 19 Drawing Figures

FIG.3b
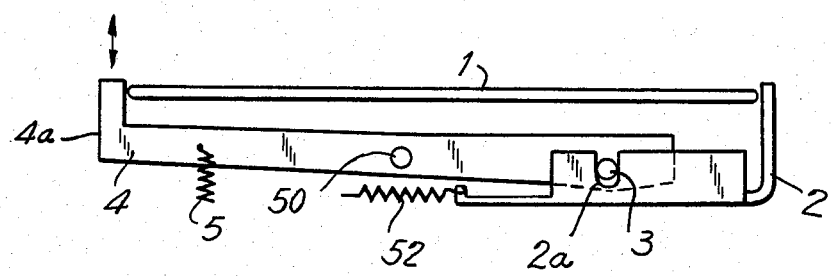
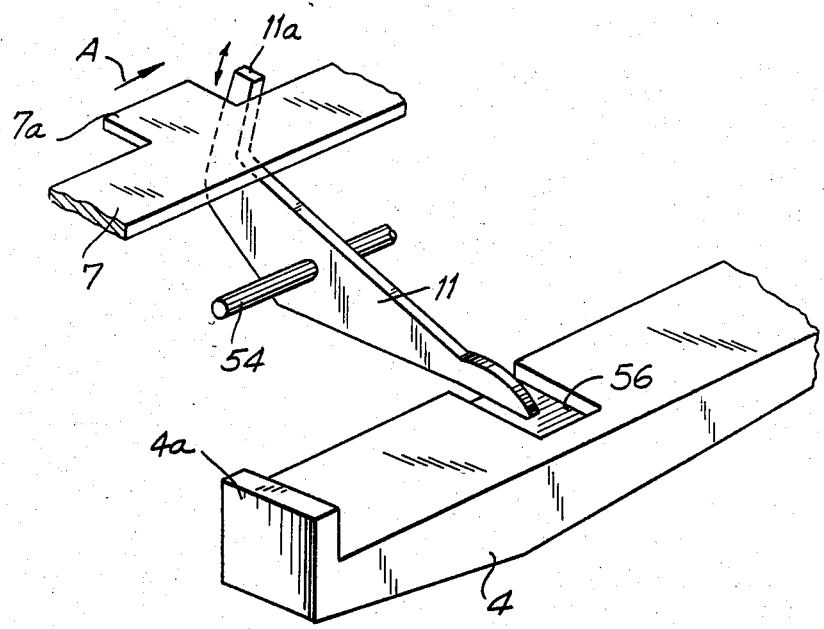
FIG.4

FIG.6a
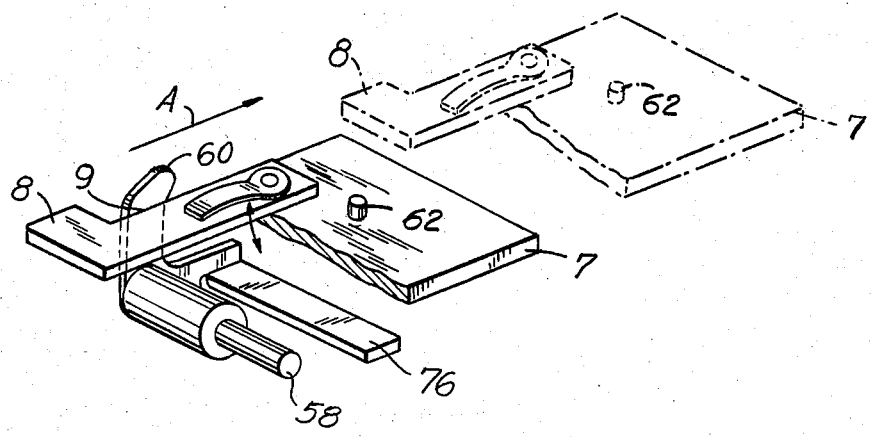
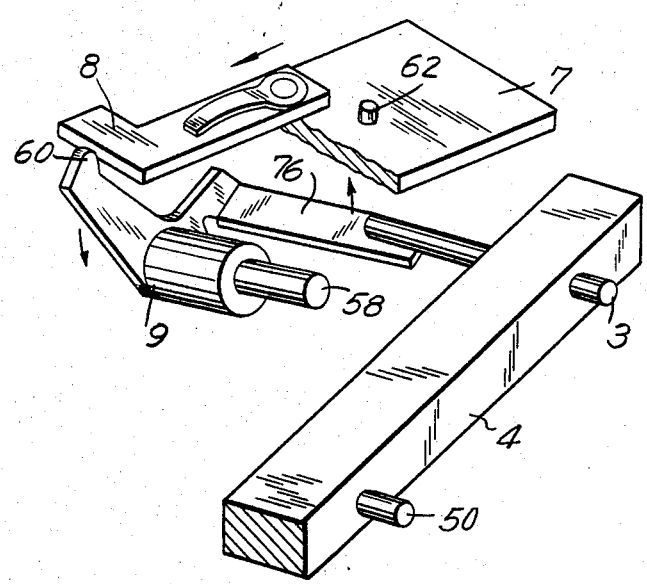
FIG.6b

FIG.7
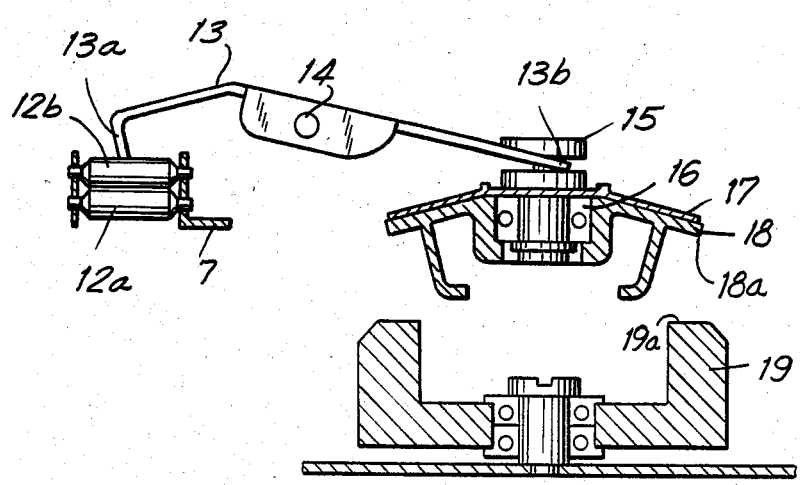
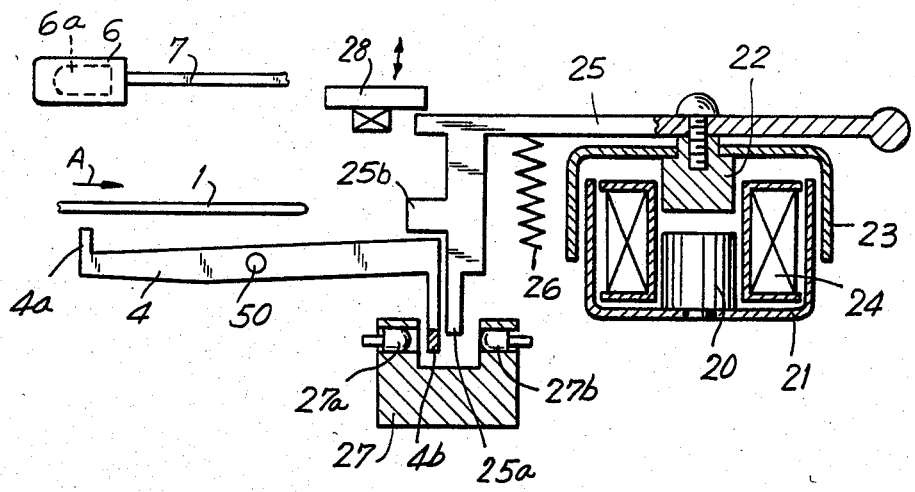
FIG.9

FLEXIBLE MAGNETIC DISK DRIVE

BACKGROUND OF THE INVENTION

This invention relates generally to a flexible magnetic disk drive of the type used for writing in and reading out of a magnetic disk and more particularly to a flexible magnetic disk drive which is small and thin. In a conventional disk mechanism, a clamp is constructed of two components, namely, a coil spring and a clutch plate. Further, rotational power of the motor is transferred to a disk drive pulley directly by a belt. In such a construction of the prior art, design of a small and thin flexible magnetic disk drive is impeded by the mechanism of clamping of the disk, and it has not been possible to provide a mechanism for ejecting the disk in a small and thin flexible magnetic disk drive.

Recently, in the field of information equipment, the magnetic memory drive has been developing rapidly. In particular, a flexible magnetic disk drive is required to be small and thin because information equipment, such as, for example, a word processor, is in general use today and as a result, portable and compact equipment is desirable and required in many instances. The structure of a conventional flexible magnetic disk drive in accordance with the prior art is illustrated in FIG. 1 wherein the apparatus includes a front door A1, a lever A2 for lowering a clutch plate A3. Also included are a disk A4, a center pulley A5, a motor A6 and a belt A7. The clutch plate A3 is lowered by pushing the front door A1 so as to act on the lever A2 which is pivoted between its ends. The clutch plate A3 acts on the center of the disk A4 and clamps the disk against the center pulley A5 which is mounted on bearings for rotation. Rotation of the motor A6 is transferred to the pulley A5 by means of the belt A7. Thus, the disk A4 is rotatingly positioned relative to a magnetic read/write head A8 in the known manner.

The magnetic disk drive of FIG. 1 has disadvantages as follows when considering the design of a thin flexible magnetic disk drive. First, when operating the front door A1, a large force is required. When the vertical space is restricted, a clutch plate constructed using a coil spring A9 for determining the clamping pressure on the disk cannot be used. Also, when the providing a thin flexible magnetic drive, it is not easy to remove the disk from the drive. Thus, a mechanism for ejecting the disk is required in the drive but in actuality there is not enough space for such a mechanism.

Further, with reference to FIG. 1, when providing a mechanism for ejecting the disk, there is a possibility that the disk is ejected inadvertently by misoperation during the time period when writing in or reading of the disk is occurring. In such a misoperation the magnetic head A8 might be damaged. Also, if the door should be closed under a condition where the disk has not been pushed entirely into the opening, the disk is not clamped precisely at its center by the clutch mechanism and this damages the disk.

Further, relative to FIG. 1, when providing a thin drive, it is difficult to obtain sufficient space for the belt A7 which connects the motor A6 with the pulley for transferring the rotation of the motor. Also, where photoelectric elements for detecting whether write-in is possible or not are mounted to circuit substrates, it is difficult to position the photoelectric elements relative to each other. Additionally, in a construction where the frame upon which the components are mounted is formed by a stamping, there are the following disadvantages. Namely, when the apparatus components are fitted to the frame, the connecting portions of the frame are distorted and thereby the accuracy within the apparatus is not satisfactory. Additionally, when the structure is designed to be small, a solenoid for moving the magnetic head vertically cannot have the same structure as is conventionally used. Also, the solenoid is positioned close to the disk and a problem is caused that magnetic flux is lost.

The flexible magnetic disk drive in accordance with the invention eliminates the disadvantages described above and provides a thin flexible magnetic disk drive.

What is needed is a flexible magnetic disk drive which positively positions a magnetic disk in position for reading and writing, is small in size vertically and laterally, and includes a disk ejection mechanism.

SUMMARY OF THE INVENTION

Generally speaking, in accordance with the invention, a flexible magnetic disk drive especially suitable for providing a mechanism for positioning a magnetic disk for reading and writing, that is small in vertical and lateral dimensions, is provided.

Interengaging members necessitate a sequence of operations in use which assure proper disk positioning in the flexible magnetic disk drive and avoid damage to the disk and the magnetic head.

Accordingly, it is an object of this invention to provide an improved flexible magnetic disk drive which is small in size and includes a disk ejection mechanism.

Another object of this invention is to provide an improved flexible magnetic disk drive which assures proper positioning of a magnetic disk and prevents damage to a magnetic disk due to improper disk positioning.

A further object of this invention is to provide an improved flexible magnetic disk drive which inlcudes a small compact disk clamping mechanism without use of a coil spring.

Still another object of this invention is to provide an improved flexible magnetic disk drive including a solenoid assembly which assures low flux leakage.

Yet another object of this invention is to provide an improved flexible magnetic disk drive which is mounted on a frame which provides flexibility in mounting components while providing rigidity in the overall assembly.

Another object of this invention is to provide an improved flexible magnetic disk drive which photoelectrically prevents mispositioning of the disk for writing thereon.

Still other objects and advantages of this invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3b is a view similar to FIG. 3a with a magnetic disk in position;

FIG. 4 is a perspective view of a portion of the mechanism of FIG. 2 to an enlarged scale;

FIGS. 6a, b are perspective views showing construction, to an enlarged scale, and operation of a portion of the mechanism of FIG. 2;

FIG. 7 is a sectional view in elevation of a disk clamping mechanism in the flexible magnetic disk drive in accordance with the invention;

FIG. 9 illustrates construction of a solenoid and a lightemitting diode mechanism for a flexible magnetic disk drive in accordance with the invention;

DESCRIPTION OF THE PREFERRED EMBODIMENTS

Figure 1:
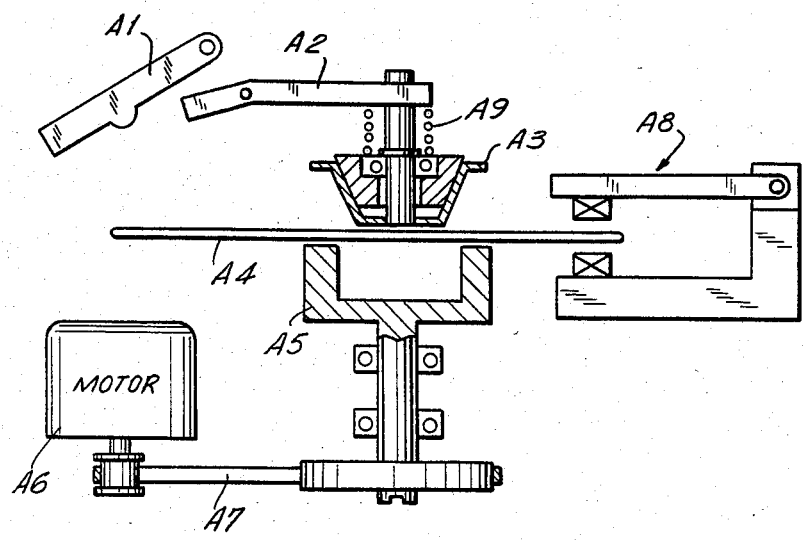
FIG. 1 is a functional drawing in elevation of a flexible magnetic disk drive in accordance with the prior art.
Figure 2:
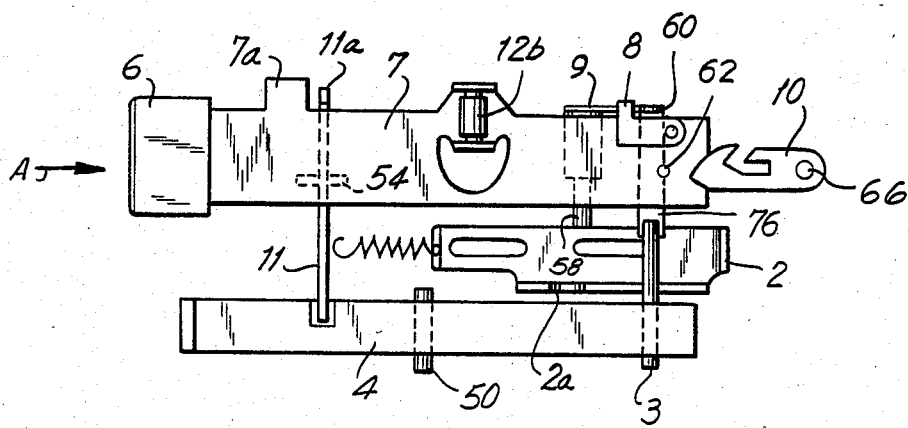
FIG. 2 is a plan view of an ejector mechanism for a flexible magnetic disk drive in accordance with the invention.
Figure 3A:
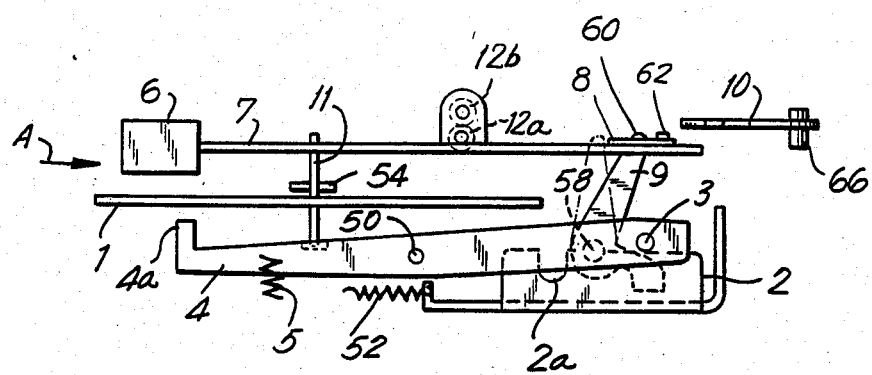
FIG. 3a is a front view of the mechanism of FIG. 2.

The flexible magnetic disk drive in accordance with the invention includes a disk ejection mechanism illustrated in FIGS. 2-6b, wherein FIG. 2 is a plan view of an ejection mechanism and FIGS. 3a, b are side elevational views. The ejection mechanism includes an ejector 2, ejector lock pin 3, ejector lock lever 4, ejector lock lever spring 5, an operational button 6, slide lever 7 fitted to the button 6, and an ejector operation lever 8 staked to the slide lever 7. The mechanism also includes an ejector transmission lever 9 for displacing the ejector lock pin 3, a latch lever 10 for locking the slide lever 7 and a safety lever 11.

Also, illustrated in FIGS. 3a, b is a magnetic disk 1. The disk is inserted in the direction of the arrow A (FIG. 3a) between the slide lever 7 and the ejection lock lever 4 until contact is made with the upwardly projecting end of the ejector 2. Then, the disk 1 pushes the ejector 2 in the direction of the arrow A. The ejector lock pin 3, which passes transversely through and is connected to the ejection lock lever 4, rides along the upper surface of the ejector 2 as the ejector 2 is moved by the disk 1, as described. The ejector lock lever 4 is pivoted about a shaft 50 and biased near the end 4a by the spring 5 such that when the ejector 2 has advanced sufficiently in the direction A, the ejector lock pin 3 seats itself in the groove 2a of the ejector 2 and the position of the ejector 2 is fixed.

At that time, the end 4a of the ejection lock lever 4 has moved up under the urging of the spring 5 so as to block removal of the disk 1 which is now centered between the ejector 2 and the end 4a of the ejection lock lever 4, as best seen in FIG. 3b. In the process of moving the ejector 2, a spring 52 is extended.

As illustrated in FIGS. 2-4, the safety lever 11 is pivoted on a shaft 54 and has one end resting in a notch 56 of the ejection lock lever 4 (FIG. 4). The other end 11a is elevated to obstruct the slide lever 7 from motion in the direction of the arrow A due to the projection 7a on the slide lever 7. However, when the disk 1 is inserted and the lock pin 3 falls into the groove 2a, the ejection lock lever 4 pivots about the shaft 50 causing the ejection lock lever 4 to rise and lift the one end of the safety lever 11. The safety lever 11 pivots about the shaft 54 and the projection 11a is lowered such that the projection 11a no longer obstructs the slide lever 7 through interference with the projection 7a. Thus, the slide lever 7 may not be operated as described more fully hereinafter prior to insertion of the disk 1. The slide lever 7 is inoperative due to the obstruction of the safety lever 11. Also, it is should be noted that the projection 4a on the ejector lock lever 4 prevents insertion of a second disk when the disk 1 is in place in the mechanism, that is, it is not possible to insert a second disk in the apparatus when a first disk is already in place.

The slide lever 7 is supported from below by a surface (not shown) which permits sliding in the direction of the arrow A and in the reverse direction. The ejector transmission lever 9 is mounted on a shaft 58 for pivoting motion thereon and the upper extremity 60 of the ejection transmission lever 9 is elevated so as to engage the ejector operation lever 8 which protrudes on one side (FIG. 2) from the slide lever 7. Thus, when the slide lever 7 is translated in the direction A, the projection on the ejector operation lever 8 causes the ejection transmission lever 9 to pivot forward, that is, to the right in FIGS. 2 and 3a.

The latch lever 10 is pivotably mounted to a portion of the frame (not shown) of the structure, pivoting about a post 66 (FIGS. 5a-d) against the force of a return spring 68. The latch lever 10 includes a cam surface 70, lateral inlet opening 72 and a ramp not visible beneath a tab 74 raised above the surface of the latch lever 10.

Figure 5A:
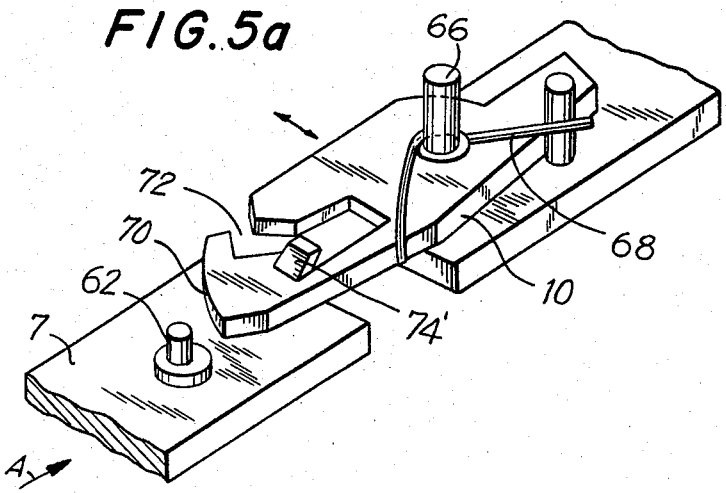
FIGS. 5a-d illustrate the construction and operation of a latching portion of the mechanism of FIG. 2.
Figures 5B, 5C, 5D:
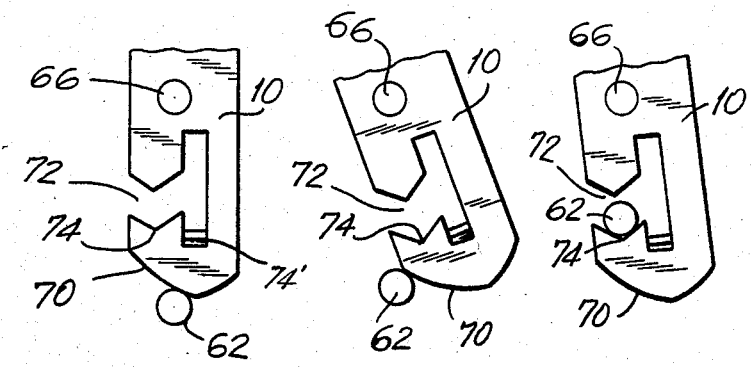

After the disk 1 has been inserted and is retained (FIG. 3b), the slide lever 7 is clear of the safety lever 11 and free to be advanced in the direction A by pushing on the pushbutton 6. As the slide lever 7 advances in the direction A a latch pin 62 on the slide lever 7 makes contact with the cam surface 70 of the latch lever 10 causing the latch lever 10 to pivot about the post 66 in opposition to a return force exerted with increasing strength by the spring 68. As seen in FIGS. 5b-d, the latch pin 62 enters the lateral opening 72 and is held in a notch 74 within the lateral opening 72. Thus, travel of the slide lever 7 in the direction A is limited by engagement of the latch pin 62 in the notch 74 and slide lever 7 is held there absent a force on slide lever in the opposite direction. When the slide lever 7 has been advanced to engage with the latch lever 10, the operation lever 8 slides (FIG. 6a) over the pivoted ejector transmission lever 9 such that the upper extremity 60 of the ejection transmission lever 9 is to the left (FIG. 2) of the ejector operation lever 8 and its projection as illustrated with broken lines in FIG. 2. As illustrated in FIGS. 6a, b the operation lever 8 is spring-loaded and the trailing edge of the portion 60 acts as a cam such that the end 60 easily passes beneath the operation lever 8 when the slide lever 7 moves in the direction A.

As explained more fully hereinafter, sliding of the slide lever 7 to its engaged position with the latch lever 10 also clamps the disk 1 in position for reading and writing thereon. When such operations are completed and it is desired to remove the disk from the mechanism, the slide lever 7 is moved in the direction opposite to the arrow A. In so doing, the latch pin 62 retained in the notch 74 of the latch lever 10 moves the right due to the contoured undersurface (not shown) of the latch lever 10 and the latch pin 62 passes under the sloped tab 74 so as to release the slide lever 7 from the latch lever 10. In so moving in the direction opposite to the direction of the arrow A, the projection on the ejection operation lever 8 pushes against the upper extremity 60 of the ejection transmission lever 9 causing the transmission lever 9 to pivot counterclockwise (FIG. 6b) about the shaft 58. When the ejector transmission lever 9 pivots in the counterclockwise direction, a laterally extending arm 76 of the transmission lever 9 moves upwardly, striking against the ejection lock pin 3 which is in engagement with the ejector lock lever 4 and causing the ejector lock pin 3 to be elevated in the notch 2a of the ejector 2.

When the pin 3 is lifted clear of the notch 2a in the ejector 2, the spring 52 which was stretched upon insertion of the disk 1, draws the ejector 2 in the direction opposite to the arrow A. Further, when the pin 3 is lifted from the notch 2a of the ejector 2, the ejector lock lever 4 pivots about the shaft 50 causing the extremity 4a of the ejector lock lever 2 to move downwardly clearing the rear edge of the disk 1. Then, contraction of the spring 52 draws the ejector 2 in the direction opposite to the arrow A and the disk 1 is ejected in a manner in reverse to that used for insertion of the disk 1.

As the slide lever 7 returns to its initial position, the ejection transmission lever 9 again slides under the lateral protrusion on the ejector operation lever 8. The safety lever 11 pivots about the shaft 54 so that the extremity 11a again obstructs the path of the projection 7a on the slide lever 7 so that the initial conditions are restored for repetition of the operation when required.

Figure 13:
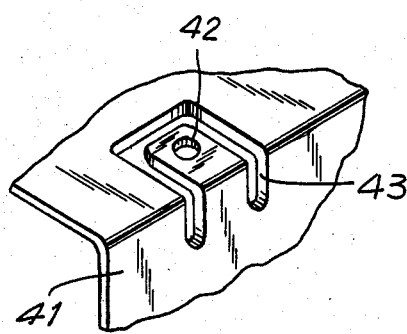
FIG. 13 is a partial perspective view to an enlarged scale of an attachment portion of a frame to which the components of the flexible magnetic disk drive in accordance with the invention are attached.

The description above of operations of insertion and ejection of a magnetic disk 1 in accordance with the invention are based on Figures in a functional, schematicized format, and it should be understood that the shafts 14, 50, 54, 58, 66 are fixed relative to a frame 41 (not shown except in part in FIG. 13).

After insertion of the magnetic disk 1 and operation of the pushbutton 6/slide lever 7, the mechanism for clamping the magnetic disk 1 for the purpose of subsequent reading or writing thereon operates. With particular reference to FIGS. 2, 3a, 7, 8, and 10a the slide lever 7 has a pair of slide rollers 12a, b mounted on brackets thereon for rotation. One extremity 13a of a clutch plate lever 13 extends over the path of the rollers 12a, b when the slide lever 7 moves in the direction A and opposite thereto.

The clutch plate lever 13 is supported for pivoting on a shaft 14 and the opposite end of the clutch plate lever 13b engages a groove in a vertical intermediate shaft 15. A bearing 16 mounts on the shaft 15 and a spring plate 17 is concentrically mounted between a shoulder of the shaft 15 and the bearing 16 (FIG. 7). It should be noted that the plate spring 17 replaces a coil spring which is used in conventional disk clutch apparatuses of the prior art. A one-piece clutch 18 is connected to the plate spring 17 and this assemblage is positioned concentrically over a center pulley 19. The disk drive pulley 19 is located beneath the disk 1 when the disk 1 is properly inserted as illustrated in FIG. 3b.

Figure 8:
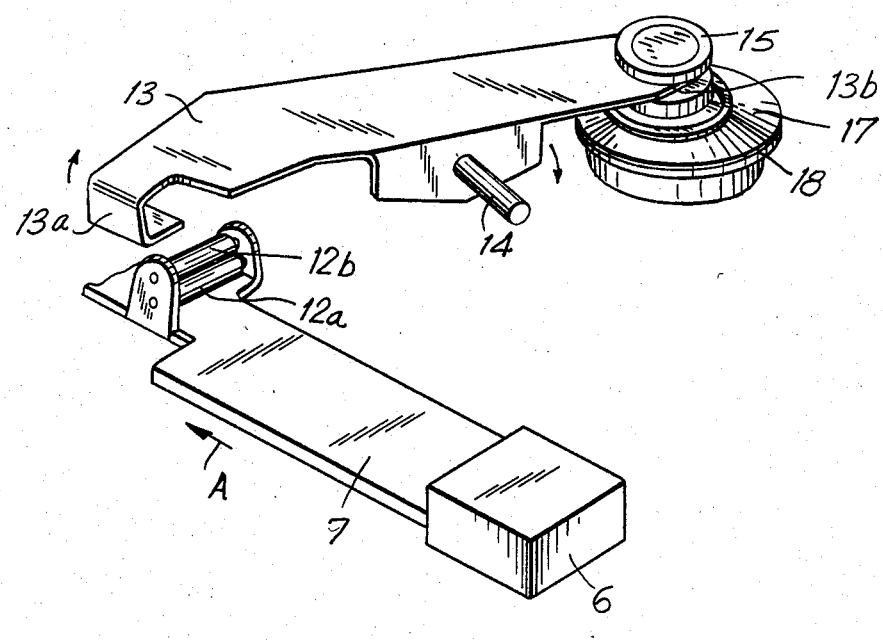
FIG. 8 is a perspective view to an enlarged scale of a portion of the mechanism of FIG. 7.

In the initial state of the device, the outer diameter of the clutch plate 18 is compressed by the plate spring 17. When the button 6 is pushed in the direction A, the slide rollers 12a, b, attached to the upper surface of the slide lever 7 begin to roll and the end 13a of the clutch plate lever 13 acting as a cam follower is lifted by the rolling of the two rollers (FIG. 8). Then, the clutch plate lever 13 pivots on the shaft 14 and the end 13b, pivotably connected in the groove of the vertical shaft 15, lowers. Thus, the outer edge 18a of the lowered clutch plate 18 presses down on an upper surface 19a of the center pulley 19. Thereby, the outer diameter of the clutch plate 18 enlarges and a suitable diameter for clamping of the disk between the clutch plate 18 and the pulley 19 is obtained.

It should be understood that when the slide lever 7 moves in the opposite direction, the cam end 13a of the clutch plate lever 13 moves off the rollers 12a, b such that the clutch plate lever 13 pivots about the shaft 14 raising the end 13b of the clutch plate lever 13 with the clutch plate 18. Thus, the disk 1 is released for ejection as described above.

Figure 10B:
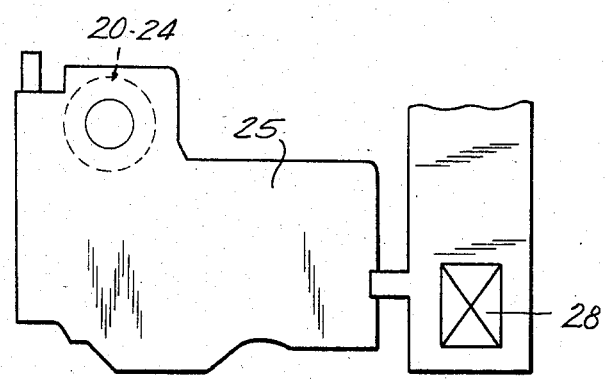
FIG. 10b is a top view of a portion of the mechanism of FIG. 9.
Figure 10A:
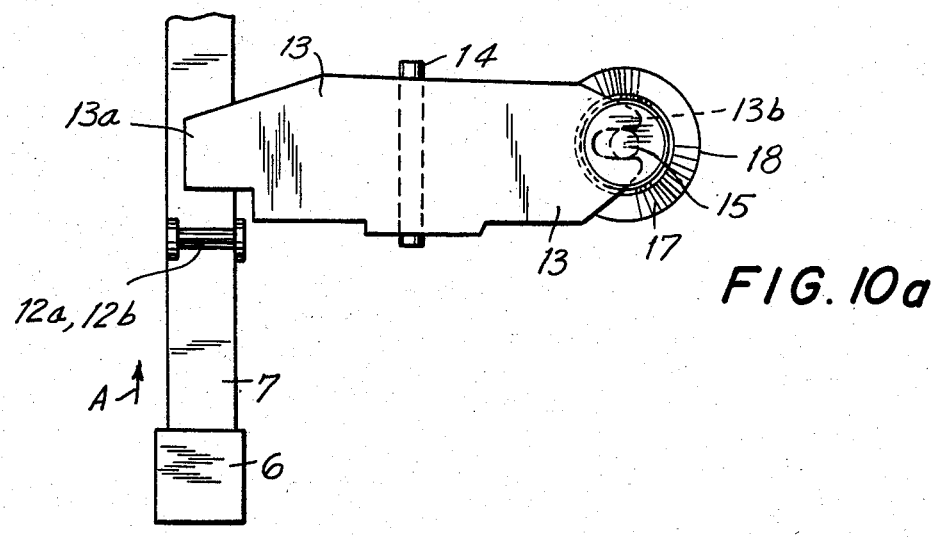
FIG. 10a is a top view of a portion of the mechanism of FIG. 7.

FIG. 9 illustrates both the inner structure of a solenoid for moving a magnetic head 28 vertically and also a flashing mechanism for a light emitting diode 6a (LED) in the pushbutton 6 on the slide lever 7. The solenoid includes an excitation coil 24, an iron core 20 and a yoke 21 and an opposed second iron core 22 and second yoke 23. A lever 25 moves the head 28 vertically in opposition to the force of a spring 26. The magnetic disk 1 and the ejector lock lever 4 are illustrated in the condition wherein the magnetic disk 1 is not yet fully inserted in the apparatus, that is, the lever end 4a has not yet been elevated. The yokes 21, 23 are concentric and telescope such that little flux is lost from the magnetic circuit. The magnetic head 28 is connected to the lever 25 for movement therewith as best seen in FIG. 10b.

The lever 25 includes a vertically extended portion 25a and a laterally extended protrusion 25b. When the ejection lock lever 4 is pivoted such that the portion 4b is down and the lever 25 descends (FIG. 9), as described more fully hereinafter, the protrusion 25b holds the ejector lock lever 4 in the pivoted position produced when the magnetic disk 1 is fully inserted. Thus, the magnetic disk 1 is retained by the ejector lock lever 4 as previously described until released from the obstruction provided by the protrusion 25b.

As illustrated in FIG. 9 (but not shown in the other Figures), the ejector lock lever 4 includes a horizontally extending portion 4b. A disk position detector 27 operates to detect the position of the ejector lock lever 4 and includes a light projection element 27a which is opposed across a gap by an optical element 27b which is sensitive to light received from the projection element 27a. Normally, before the magnetic disk 1 is inserted, light from the projection element 27a is obstructed from the optical element 27b by the portion 4b at the end of the ejector lock lever 4 for detecting the position of a disk 1. The detector 27 acts as a switch for a circuit (not shown) such that the circuit is off and the light emitting diode 6a in the pushbutton 6 is not lit when no disk 1 has been inserted. When the disk 1 is inserted into the mechanism and the ejector 2 is fully driven to its proper position causing the ejector lock lever 4 to pivot, the detection portion 4b is lowered and thereby light is allowed to pass through the disk position detector 27 from projection element 27a to receiving element 27b and the light emitting diode 6a in the operating button 6 becomes lit. This indicates that a magnetic disk 1 has been inserted and is in position.

Following that the operating button 6 is pushed and through action of the slide lever 7, slide rollers 12a, b and motion of the plate lever 13 (FIG. 7), described above, the lever 25 is lowered vertically (FIG. 9) by a mechanism (not shown). Lowering of the lever 25 causes the portion 25a for detecting a disk position at the end of the lever 25 to lower and interrupt the light passing through the disk position detector 27. As a result, the light emitting diode 6a in the operating button 6 is turned off again.

Then, for reading or writing of the magnetic disk 1, the solenoid excitation coil 24 is energized by a circuit signal. Thereby the iron core 22 is attracted to the ion core 20 and in the process the lever 25 is lowered vertically, by a further distance than described above, against the force of the spring 26 and the magnetic head 28 is brought to the proper position relative to the surface of the disk 1. When reading or writing on the disk 1 is completed, the excitation coil 24 is de-energized and the lever 25 rises with the magnetic head 28 in response to the force of the spring 26. Operation of the slide lever 7, as described above, then releases the magnetic disk from the mechanism.

Figure 11:
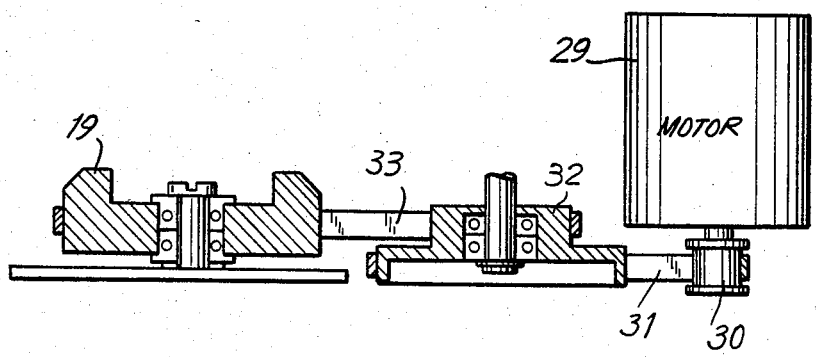
FIG. 11 is a side elevational view of a power transmission mechanism for a flexible magnetic disk drive in accordance with the invention.

FIG. 11 illustrates a mechanism for transmitting power including a motor 29, motor pulley 30 for transmission of motor rotation, belt 31, an intermediate wheel 32 engaging the belt 31, a belt 33 engaging the intermediate wheel 32 and a center pulley 19. In this mechanism, rotation of the motor 29 is transmitted to the center pulley 19 (FIGS. 7, 11) through the intermediate wheel 32 in two steps using two belts. Thus, a speed reduction is effected without resorting to a large diameter center pulley 19, and the height of the assembly is kept low.

Figure 12:
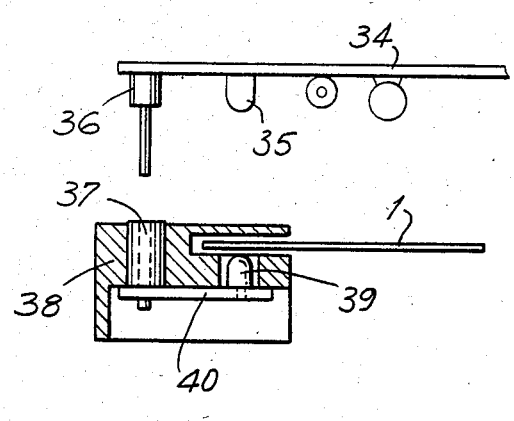
FIG. 12 is a position detecting mechanism for preventing mis-writing in a flexible magnetic disk drive in accordance with the invention.

FIG. 12 is a diagram indicating means for connection of an electromechanical device for assuring proper position of the magnetic disk 1 when writing-in. FIG. 12 includes a circuit substrate 34, a light projecting element 35 mounted thereon, and a connecting pin 36 attached to said circuit substrate 34. Also included is a disk guide 38 having a photosensitive optical element 39 mounted thereon, a circuit substrate 40 holding said optical element 39 and a female connector 37 mounted to the circuit substrate 40 for receiving therein the projection element 35 connected to the substrate 34. Thus, alignment between the optical elements 35, 39 is assured by insertion of the pin 36 in the connector 37. The light path is intercepted only when a magnetic disk 1 is in the proper position for writing.

FIG. 13 is a detail of the structure, more particularly, a frame 41 used for mounting components. A screw hole 42 is provided for fitting components to the frame 41 and a slot 43 is provided such that the screw hole 42 is surrounded on three sides by the slot 43 and is, in effect, on a tab supported only at one edge. This construction provides flexibility in connecting components to the frame 41 especially components requiring more than one hole 42 for proper positioning. Flexibility immediately around the screw hole 42 by means of the slot 43 allows components to be mounted to the frame with less overall distortion to the frame 41.

The above described flexible magnetic disk drive in accordance with the invention has the following results and advantages. Clamping force to hold a magnetic disk in place for reading or writing is supplied through slide rollers by pushing, not a front door, but a button such that a large force is not required. Further, a thin device of small vertical dimension is available.

The structure of the clutch plate operating mechanism is modified as compared to the prior art. In a conventional mechanism, the clutch plate is formed by two pieces, namely, a coil spring for determining the clamping pressure, and a clutch plate. On the other hand, in accordance with the invention, a plate spring determines the clamping pressure in conjunction with the clutch plate lever. As a result, a thinner clutch plate operating mechanism is provided and effective use of space is achieved especially because the clutch plate requires less space vertically than does a coil spring.

The ejection mechanism is of low profile and thus, is suitable for use in a thin-type flexible magnetic disk drive. In accordance with the invention, the disk cannot be removed from the device during the time of writing-in or reading because of the protrusion 25b on the lever 25 (FIG. 9) and there is no possibility that the magnetic head 28 is damaged. If the disk 1 is not completely inserted to the proper position, the operating button 6 cannot be pushed and again there is no possibility of damage to the disk. The transmission mechanism has two steps, that is, rotation of the motor is first transferred to an intermediate wheel and then the rotation is further transmitted from the intermediate wheel to the center pulley of the magnetic disk drive. As a result, the energy transmission function is performed within a small lateral and vertical space.

Registration of photoelectric elements to prevent miswriting-in is accomplished by a mechanical pin connector so that setting of a screw on a circuit substrate is easier because the photoelectric elements are prealigned by the pin connector.

Further, attaching portions of the frame to which components are connected, have a construction which provides local flexibility but added rigidity for the overall frame. Thus, it is possible to produce a small, lightweight disk drive easily without deterioration of function and accuracy of the flexible magnetic disk drive. In accordance with the invention, a guide for the solenoid depends on external means so that construction of the solenoid is very simple and the device is provided at a moderate price. Further, as the yoke is of the closed type, as described above, there are rarely problems such as magnetic flux leakage and erroneous elimination of data. As stated above, the lever 4 prevents insertion of a magnetic disk when another magnetic disk is already in place and a light-emitting diode in the push-button prevents the operator from forgetting to push the button. Thus, there is no error wherein an attempt is made to operate the machine without clamping of the magnetic disk after a disk has been pushed into the mechanism.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A flexible magnetic disk drive including a disk ejection mechanism comprising:
    an ejector having a portion for contact by a magnetic disk inserted in said ejection mechanism, said ejector being subject to translation by force of said inserted disk pushing in a first direction on said portion for contact, and a first engagement portion;
    spring means for opposing said translation of said ejector, said spring means tending to return said ejector in a second direction opposite to said first direction to a non-translated position;
    a lock lever mounted for pivoting about an axis and including a second engagement portion, said first engagement portion of said ejector and said second engagement portion of said lock lever being subject to interengagement upon translation of said ejector to a selected position by said disk, said lock lever pivoting in one direction during said interengagement, said lock lever having a blocking portion, said blocking portion being for blocking removal of said disk when said disk is in said drive, said blocking portion being coupled to said lock lever so that said blocking portion is moved into a blocking position by said pivoting in said one direction;
    a slide lever, and an ejection transmission lever, said ejection transmission lever being pivotally mounted in said drive and configured so that said ejection transmission lever is subject to pivoting upon motion of said slide lever in an ejecting direction, said ejection transmission lever being pivoted into contact with said second engagement portion of said lock lever when said slide lever moves in said ejecting direction, contact of said ejection transmission lever and said second engagement portion causing disengaging of said first and second engaging portions, and pivoting of said lock lever about said axis upon said disengagement, said blocking portion of said lock lever moving from said blocking position, said spring means moving said ejector in said second direction, said ejector portion for contact by said magnetic disk causing said disk to be ejected as said ejector is forced to return to said non-translated position by said spring means.

2. A flexible magnetic disk drive as claimed in claim 1, and further comprising separated photoelectric elements for transmitting and receiving light therebetween, said elements being mounted on independent circuit substrates, said substrates and photoelectric elements being maintained in alignment by a pin connected to and extending from one said substrate and received in a female connector on the second said substrate.

3. A flexible magnetic disk drive as claimed in claim 1, wherein said first engagement portion is a receptacle on said ejector and said second engagement portion is a protrusion on said ejector lock lever.

4. A flexible magnetic disk drive as claimed in claim 1, wherein said first engagement portion is a receptacle on said ejector and said second engagement portion is a protrusion on said ejector lock lever.

5. A flexible magnetic disk drive as claimed in claim 1, and further comprising a clutch plate operating mechanism for rotating said disk, said disk being located at said selected position, said clutch plate operating mechanism comprising:
    a clutch plate for clamping said positioned disk;
    a clutch plate lever of extended length pivoting about an axis between the ends of said clutch plate lever, said clutch plate being rotatably connected to one end of said clutch plate lever, the other end of said clutch plate lever including a cam follower;
    cam means for engagement with said cam follower, said cam means being connected to said slide lever for movement therewith, said slide lever when moved in a second direction opposite to said first direction of said slide lever causing said cam follower to follow said cam, said clutch plate lever pivoting on its said axis and causing said connected clutch plate to translate said clutch plate engaging and clamping said positioned disk when said cam means and cam follower interact.

6. A flexible magnetic disk drive as claimed in claim 5, wherein said clutch plate is resilient and mounted to a plate spring, said plate spring giving an initial deflection to said clutch plate.

7. A flexible magnetic disk drive as claimed in claim 5, and further comprising a safety lever, said safety lever being pivotably mounted about an axis between opposite ends of said safety lever, one end of said safety lever contacting said ejector lock lever, the other end of said safety lever obstructing motion of said slide lever when said ejector is not translated by a disk inserted to said selected position, said safety lever being pivoted by said ejector lock lever and not obstructing said slide lever when a disk translates said ejector to said selected position.

8. A flexible magnetic disk drive as claimed in claim 7, and further comprising a magnetic head for reading and writing said disk and a solenoid, said solenoid including a pair of opposed yokes and cores positioned with a gap between said cores, energization of said solenoid causing one said core to move and reduce said gap, said magnetic head being connected to said moving core for translation therewith.

9. A flexible magnetic disk drive as claimed in claim 8, wherein said yokes are concentric concave cups of differing diameters, the open end of one said yoke telescoping within the open end of the other said yoke.

10. A flexible magnetic disk drive as claimed in claim 7, and further comprising a magnetic head for reading and writing said disk, and a head lever for moving said magnetic head up and down, a projection on aid head lever blocking motion of said ejector lock lever when said head lever moves to engage said disk, said disk being located at said selected position.

11. A flexible magnetic disk drive as claimed in claim 10, and further comprising photoelectric detection means including a light emitter element and a light detection element, said elements being spaced apart, a portion of said ejector lock lever obstructing a light path between said elements when no disk is in said flexible magnetic disk device, said ejector lock lever being pivoted out of said light path when a disk is properly inserted in said flexible magnetic disk drive, a portion of said head lever intercepting said light path when said slide lever moves in said second direction, completion of said light path closing a switch circuit, obstructing said light path opening said switch circuit.

12. A flexible magnetic disk drive as claimed in claim 11, and further comprising a button on said slide lever for pushing thereon, and a light connected with said button, said light being lit by said switch circuit when said light path is not obstructed.

13. A flexible magnetic disk drive as claimed in claim 5, wherein said clutch plate operating mechanism further comprises a center pulley, said center pulley being opposed to said clutch plate, said disk being clamped between said clutch plate and said center pulley for rotation.

14. A flexible magnetic disk drive as claimed in claim 13, and further comprising a motor, a pulley on the shaft of said motor connecting to an intermediate pulley by way of a first belt, said intermediate pulley connecting to said center pulley by means of a second belt, a two step speed change being provided between said motor shaft and said center pulley.

15. A flexible magnetic disk drive as claimed in claim 1, and further comprising a safety lever, said safety lever being pivotably mounted about an axis between opposite ends of said safety lever, one end of said safety lever contacting said ejector lock lever, the other end of said safety lever obstructing motion of said slide lever when said ejector is not translated by a disk inserted to said selected position, said safety lever being pivoted by said ejector lock lever and not obstructing said slide lever when a disk translates said ejector to said selected position.

16. A flexible magnetic disk drive as claimed in claim 15, and further comprising a magnetic head for reading and writing said disk, and a head lever for moving said magnetic head up and down, a projection on said head lever blocking motion of said ejector lock lever when said head lever moves to engage said disk, said disk being located at said selected position.

17. A flexible magnetic disk drive as claimed in claim 1, wherein said disk ejection mechanism is attached to a frame, said frame including attachment holes for receiving screws therein, at least one said hole being at least in part surrounded by a slot at right angles to the surface of said frame, said slot providing flexibility of said frame in the vicinity of said at least one hole.

* * * * *